United States Patent Office 3,257,270
Patented June 21, 1966

---

3,257,270
S-[(ARYLTHIO) (PHOSPHINYL) METHYL] PHOSPHOROUS ESTER INSECTICIDES
Gail H. Birum, Kirkwood, Mo., assignor to Monsanto Company, St. Louis, Mo., a corporation of Delaware
No Drawing. Filed Aug. 4, 1964, Ser. No. 387,505
8 Claims. (Cl. 167—22)

This application is a continuation-in-part of copending application Serial No. 80,034, filed January 3, 1961, now U.S. Patent 3,183,256.

The present invention relates to sulfur-containing organic compounds of phosphorus. More particularly, this invention relates to the insecticidal use of S-[(arylthio) (phosphinyl)methyl] derivatives of phosphorothioic, phosphonothioic and phosphinothioic acid esters, and to insecticide compositions containing them as an active ingredient.

In accordance with this invention there are provided as active ingredients of the insecticidal compositions compounds of phosphorus having the structure,

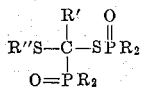

wherein R is selected from the group consisting of hydrocarbyl, hydrocarbyloxy, and halohydrocarbyloxy radicals having from 1 to 6 carbon atoms; R' is selected from the group consisting of hydrogen, chlorine, bromine, and alkylthio, arylthio, and alkarylthio radicals having from 1 to 15 carbon atoms, and chlorine and bromine-substituted derivatives thereof; and R'' is selected from the group consisting of phenyl, chlorophenyl, bromophenyl, and alkylphenyl radicals having from 7 to about 12 carbon atoms.

Compounds of the above described type are prepared by reacting a phosphoranoate ester of the formula,

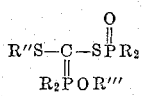

wherein R and R'' are as defined above, and R''' is selected from the group consisting of aliphatic and halogen-substituted aliphatic radicals having from 1 to 6 carbon atoms, with a halogen-containing reactant having a general formula selected from the group consisting of HX, X₂ and R'X, wherein X is selected from the group consisting of bromine and chlorine, and R' denotes an alkyl thio radical, branched or straight-chain, having from 1 to 15 carbon atoms, chlorine- and bromine-substituted derivatives thereof, phenyl and alkylphenyl radicals having from 7 to about 15 carbon atoms total and chlorine- and bromine-substituted derivatives thereof.

For example, reaction of diphosphorus phosphoranoate esters with halogen-containing reactants proceeds according to the following general equation:

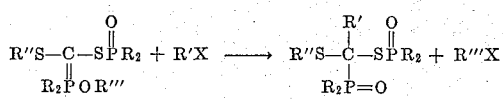

wherein R, R', R'', and R''' are as defined above. Specific examples are:

(a) Reaction of tris(2-bromopropyl){(pentachlorophenylthio)[bis - 2 bromopropoxy)phosphinylthio]methylene}phosphoranetrioate with hydrogen bromide to obtain bis(2-bromopropyl) S-{(pentachlorophenylthio)-[bis(2-bromopropoxy)phosphinyl]methyl}phosphorothioate:

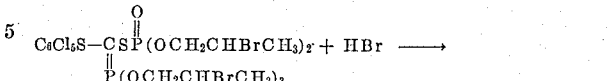

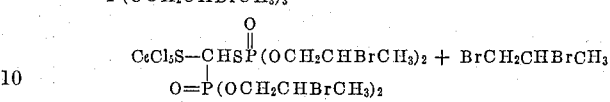

(b) Reaction of diethyl[(p-tolylthio)(ethoxyethylphosphinylthio)methylene]ethylphosphoranedioate with bromine to obtain ethyl S-[(p-tolylthio)(ethoxyethylphosphinyl)bromomethyl]ethylphosphonothioate:

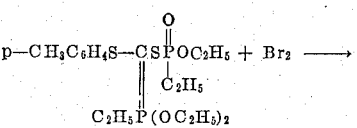

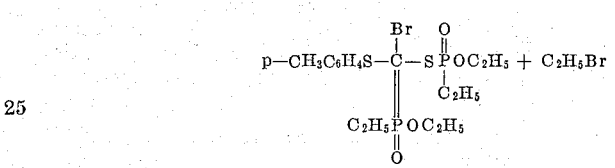

(c) Reaction of trimethyl[(2,4-dibromophenylthio)-(dimethoxyphosphinylthio)methylene]phosphoranetrioate with dichloromethanesulfenyl chloride to obtain dimethyl S - [(2,4 - dibromophenylthio)(dimethoxyphosphinyl)(dichloromethylthio)methyl]phosphorothioate

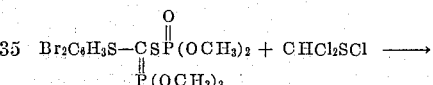

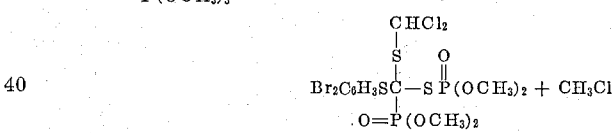

The reaction which occurs according to the process of this invention is believed to proceed according to the following general equation wherein hydrogen chloride is used as an exemplary halogen-containing reactant:

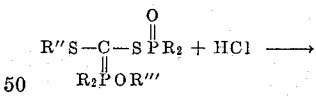

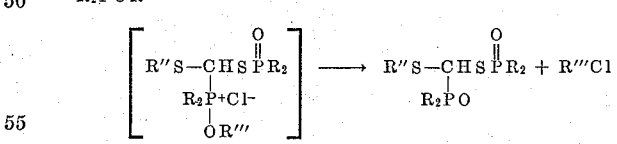

The reactions of phosphoranoate esters of the above defined types with hydrogen bromide, hydrogen chloride, bromine, chlorine, and sulfenyl chlorides and bromides, as defined above, are believed to proceed according to similar mechanisms. Thus, as a result of the reaction of this invention, the carbon to phosphorus double bond of the phosphoranoate ester is eliminated and the ester gives up one aliphatic or halo-aliphatic group which combines with a bromine or chlorine atom from the halogen-containing reactant to form a halo-hydrocarbon by-product, and the residue of the halogen-containing reactant becomes bonded to the methylene carbon atom of the original phosphoranoate ester.

The phosphoranoate esters which are used as starting materials for preparing the active ingredients in the compositions of this invention may themselves be prepared by reacting a triorgano ester of a trivalent phosphorus acid having at least one aliphatic or halogen-substituted aliphatic radical of from 1 to 6 carbon atoms bonded through oxygen to the phosphorus atom with certain sulfur- and halogen-containing compounds. When such an ester, e.g., triethyl phosphite, is reacted with an aryl, haloaryl, or an alkaryl chlorodithioformate, i.e., a compound of the formula

where R″ is as defined above, e.g., phenyl chlorodithioformate, the phosphoranoate ester obtained has the structure,

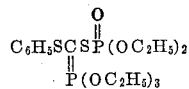

which contains a carbon to phosphorus double bond and two pentavalent phosphorus atoms. The preparation of the phosphoranetrioate esters used as starting materials in this invention, and the materials from which they are made are described in applicant's copending application, Serial No. 39,239, filed June 28, 1960, now U.S. Patent 3,089,891 which is incorporated herein by reference.

Illustrative examples of phosphoranetrioate ester starting materials as defined above, and obtained by reacting phosphite esters with a chlorodithioformate compound are:

trimethyl[(phenylthio)(dimethoxyphosphinylthio)methylene]phosphoranetrioate,
tris(2-chlorobutyl){(p-chlorophenylthio)[bis(2-chlorobutoxy)phosphinylthio]methylene}phosphoranetrioate,
triallyl[(p-tolylthio)(diallyloxyphosphinylthio)methylene]phosphoranetrioate,
tris(2-butynyl){(pentachlorophenylthio)[bis(2-butynyloxy)phosphinylthio]methylene}phosphoranetrioate, and
bis(2-chloro-3-pentenyl)propyl{(phenylthio)[bis(2-chloro-3-pentenyloxy)phosphinylthio]methylene}phosphoranetrioate.

Phosphoranedioate ester starting materials obtained by reacting the chlorodithioformate compound with a phosphonite ester are, e.g., diethyl[(p-bromophenylthio)(ethoxyphenylphosphinylthio)methylene]phenylphosphoranedioate,
dihexyl[(xylylthio)(hexyloxyhexylphosphinylthio)methylene]hexylphosphoranedioate,
bis(2-bromopropyl){(2,4,5-trichlorophenylthio)[(2-bromopropoxy)propylphosphinylthio]methylene}propylphosphoranedioate,
cyclohexyl ethyl[(phenylthio)(cyclohexyloxyethylphosphinylthio)methylene]ethylphosphoranedioate,
bis(2-butenyl){(p-chlorophenylthio)[(2-butenyloxy)(2-butenyl)phosphinylthio]methylene}(2-butenyl)phosphoranethioate, and
bis(3-hexynyl){(p-bromophenylthio)[(3-hexylyloxy)(3-hexynyl)phosphinylthio]methylene}(3-hexynyl)phosphoranedioate.

Similarly, phosphoranoate esters derived from phosphinite esters and chlorodithioformate reactants as defined above may also be used to prepare compounds within the scope of this invention. Examples of such compounds are:

propyl[(phenylthio)(dipropylphosphinylthio)methylene]dipropylphosphoranoate,
2-chlorobutyl[(2,4,5-trichlorophenylthio)(diphenylphosphinylthio)methylene]diphenylphosphoranoate,
allyl[(p-chlorophenylthio)(diallylphosphinylthio)methylene]diallylphosphoranoate, and
amyl{(p-tolylthio)[bis(2-pentynyl)phosphinylthio]methylene}bis(2-pentynyl)phosphoranoate.

The hydrogen bromide, hydrogen chloride, bromine and chlorine reactants used to prepare compounds of this invention are readily obtainable materials. The sulfenyl halides, i.e., those having the formula R′X, where R′ is selected from the group consisting of alkylthio, chloroalkylthio, bromoalkylthio radicals having from 1 to 15 carbon atoms, and phenyl, chlorophenyl, bromophenyl radicals, and alkaryl, chloroalkaryl and bromoalkaryl radicals having from 7 to 15 carbon atoms, are illustrated by the following examples: methyl-, ethyl-, propyl-, isopropyl-, butyl-, tert-butyl-, amyl, hexyl-, 2-ethylhexyl-, octyl-, decyl-, dodecyl-, tetraisopropyl-, triisobutyl-, tetradecyl-, and pentadecylsulfenyl chlorides and bromides; the chlorinated and brominated derivatives thereof, e.g., trichloromethyl-, tribromomethyl-, dichloromethyl-, 2-chloroethyl-, 2-bromopropyl-, 2,4-dichlorobutyl-, 3-bromopentyl-, 2,6-dichlorohexyl-, 10,11-dibromodecyl-, 4,4,6-trichloropentadecylsulfenyl chlorides and bromides; the arylsulfenyl chlorides and bromides, e.g., benzenesulfenyl chloride, the alkphenylsulfenyl chlorides and bromides, for example, toluenesulfenyl bromide, 2,4-xylenesulfenyl chloride, mesitylenesulfenyl bromide; as well as the chlorinated and brominated derivatives thereof, e.g., 2,4-dibromobenzenesulfenyl chloride, pentachlorobenzenesulfenyl chloride, 2-chloro-4-methylbenzenesulfenyl chloride, etc.

In general, reaction of phosphoranoate esters of the above defined types with hydrogen bromide, hydrogen chloride, chlorine, bromine, or a sulfenyl chloride or bromide as described above occurs readily at ordinary, decreased, or increased temperatures within the range of about 0° C. to about 150° C., with temperatures on the order of from 0–75° C. being preferred in most cases. Although cooling is not necessary, once the reaction has started, it is usually preferred to apply some cooling to minimize the formation of decomposition products that might result from operation at unnecessarily high temperatures. When employing the more reactive compounds, reaction may be essentially complete at ordinary temperatures or below, but it is usually preferred to apply external heating after the initial exothermic reaction has subsided. The degree of heating will depend upon the nature of the reactants but will generally vary to below the decomposition point of the reaction mixture. Temperatures of up to 150° C. may be useful when employing the less reactive starting materials. In some instances, particularly when employing the more reactive phosphoranoate esters and/or solid reactants, the use of an inert solvent or diluent is advantageous. Such inert solvents or diluents may be, for example, benzene, hexane, xylene, ether, etc. While the reactants are advantageously employed in stoichiometric proportions, such proportions need not be employed since any unreacted material is readily recovered from the reaction products.

The present thiophosphorus acid esters are stable, well-defined compounds which range from viscous liquids to waxy or crystalline solids. They may be advantageously employed for a variety of industrial purposes, but are particularly useful as the active ingredient in insecticidal compositions. As herein shown, the present compounds are particularly toxic to mites and leaf-feeding insects when applied as a spray admixed with a liquid or solid carrier adjuvant. They also possess significant systemic action. When using the compounds of the present invention in insecticidal compositions or in other applications, removal of the by-products of the reaction may be unnecessary. In fact, there may be advantages in retaining the by-products in the major product.

Although these compounds are useful per se in controlling a wide variety of insect pests, it is preferable that they be supplied to the insect pests or to the environment of the insect pest or pests in a dispersed form in a suitable extending agent.

In the instant specification and appended claims it is to be understood that the term "dispersed" is used in its widest possible sense. When it is said that the above described S[(arylthio)(phosphinyl)methyl] derivatives of phosphorothioic, phosphonothioic, and phosphinothioic acid esters of this invention are dispersed, it means that the particles of the esters may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointments base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of these esters in a carrier such as dichlorodifluoromethane and like fluorochloroalkanes which boil below room temperature at atmospheric pressure.

In the instant specification and appended claims it is to be understood that the expression "extending agent" includes any and all of those substances in which these S-[(arylthio)(phosphinyl)methyl] phosphoric acid derivatives are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the ester derivatives of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the active phosphorothioate, phosphonothioate, or phosphinothioate employed to supply the desired dosage generally will be in the range of 0.001 to 50 percent by weight. When the extending agents is a semi-solid or solid, the concentration of the phosphorus ester employed to supply the desired dosage generally will be in the range of 0.1 to 25 percent by weight. From a practical point of view, the manufacturer must supply the agriculturist with a lost-cost concentrate or spray base or particulate solid base in such form that, by merely mixing with water or solid extender (e.g. powdered clay or talc) or other low-cost materials available to the agriculturist at the point of use, he will have an easily prepared insecticidal spray or particulate solid. In such a concentrated composition, active phosphorus ester generally will be present in a concentration of 5 to 95 percent by weight, the residue being any one or more of the well-known insecticidal adjuvants, such as the various surface-active agents (e.g. detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphorus ester of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naptha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic ethers and the aliphatic ketones containing not more than about 10 carbon atoms as exemplified by acetone, methylethyl ketone, diisobutyl ketone, dioxane, isopropyl ether, and the like. In certain instances, it is advantageous to employ a mixture of organic liquids as the extending agent.

When the above described phosphorus ester ingredients of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The S-[(arylthio)(phosphinyl)methyl] pentavalent phosphorus ester ingredient of this invention are preferably supplied to the insect pests or to the environment of the insect pests in the form of emulsions or suspensions. Emulsions or suspensions are prepared by dispersing the phosphorus ester either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents," and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active (or cationic), or non-ionizing (or non-ionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947, issue of Chemical Industries (pages 811–824) in an article entitled "Synthetic Detergents" by John W. McCutcheon and also in the July, August, September and October, 1952, issues of Soap and Sanitary Chemicals under the title "Synthetic Detergents." The disclosures of these articles with respect to surfactants, i.e., the anionactive, cation-active and non-ionizing capillary active substances, are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water soluble non-ionic surfactants be employed.

The above described phosphorus ester ingredients of this invention can be dispersed by suitable methods (e.g., tumbling or grinding) in solid extending agents either of organic or inorganic nature and supplied to the insect pest environment in particulate form. Such solid materials include, for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprayable compositions.

For special purposes the phosphorus esters, above described can be dispersed in a semi-solid extending agent such as petrolatum or soap (e.g., sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of the S-[(arylthio)(phosphinyl)methyl] pentavalent phosphorus ester with a water-soluble surfactant which lowers the surface tension of water in the weight proportions of 0.1 to 15 parts of surfactant with sufficient of the phosphorus ester active ingredient of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of diethyl S-[(p-chlorophenylthio)(diethoxyphosphinyl)methyl] phosphorothioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphorous ester of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of ethyl S-[(pentachlorophenylthio)(ethoxyethylphosphinyl) chloromethyl] ethylphosphonothioate in benzene which solution contains dissolved therein a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates as exemplified by sodium decylbenzene sulfonate and sodium dodecylbenzene sulfonate. Of the non-ionic surfactants, the particularly preferred are water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for insecticidal purposes, the active ingredient can be one or more of the compounds of this invention. The compounds described above can also be advantageously employed in combination with other pesticides, including, for example, nematocides, bacterocides, fungicides, and herbicides. In this manner it is possible to obtain mixtures which are effective against a wide variety of other forms of noxious life.

In controlling or combatting insect pests the pentavalent phosphorus esters described above either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with the insect pests or attractable to the pests for habitational or sustenance or propagational purposes, in any conventional fashion which permits contact between the insect pests and the phosphonothioates of this invention. Such dispersing can be brought about by applying these esters per se or in sprays or particulate solid compositions containing same to a surface infested with the insect pests or attractable to the pests, as for example, the surface of an agricultural soil or other media such as the above ground surface of plants by any of the conventional methods, e.g. power dusters, broom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation thereof therein.

The invention is further illustrated, but not limited, by the following examples.

EXAMPLE 1

This example illustrates the preparation of the phosphoranoate starting materials as well as the process of preparing compounds which may be used as the active ingredient in controling insects of this invention.

A 27.1 g. (0.075 mole) portion of pentachlorophenyl chlorodithioformate and 75 ml. of benzene were placed in a 500 ml. flask and stirred as 26.6 g. (0.16 mole) of redistilled triethyl phosphite was added in about 2 minutes. The temperature increased spontaneously to 47° C. The reaction mixture was stirred for 0.75 hour and then warmed to 70° C. Most of the benzene was removed under water pump vacuum. The residue crystallized to a yellow solid. This was recrystallized from hexane to obtain 38.0 g. of a light yellow solid, M.P. 106–107° C., which was triethyl [(pentachlorophenylthio)(diethoxyphosphinylthio)methylene]phosphoranetrioate,

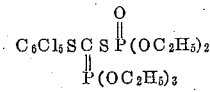

A solution of 12.6 g. (0.02 mole) of the above product in 50 ml. of benzene was treated with anhydrous hydrogen chloride at 3–10° C. until there was no longer heat of reaction and hydrogen chloride was passing through a condenser which was part of the apparatus used. The reaction mixture was concentrated to 110° C./0.5 mm., and the residue was recrystallized from hexane to give 10.7 g. (89% yield) of a white solid, M.P. 72–73° C., having nuclear magnetic phosphorus resonance absorptions of about equal areas at −23.4 and −17.6 parts per million (p.p.m.) relative to phosphoric acid. The infrared spectrum has bands at 1266 and 1258 cm.$^{-1}$, indicating the presence of two phosphoryl groups. The compound analyzed as follows:

Calc'd for $C_{15}H_{21}Cl_5O_6P_2S_2$: C, 30.1%; H, 3.5%; Cl, 29.5%; P, 10.3%; S, 10.7. Found: C, 30.1%; H, 3.4%; Cl, 29.5%; P, 10.3%; S, 10.5.

Based on this information, the compound was assigned the structure,

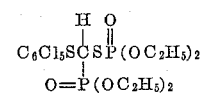

which is diethyl S-[(pentachlorophenylthio)(diethoxyphosphinyl)methyl] phosphorothioate.

EXAMPLE 2

Another 0.02 mole portion of triethyl [(pentachlorophenylthio)(diethoxyphosphinylthio) methylene] phosphoranetrioate, prepared as in Example 1, was dissolved in 75 ml. of methylene chloride, and 0.028 mole of gaseous chlorine was added in 0.1 hour with cooling at 8–10° C. The reaction mixture was swept with nitrogen for 0.2 hour and then concentrated to 70° C./0.2 mm. to give a viscous red oil which crystallized after standing for several days. Recrystallization of about two-thirds of this product from hexane-methylene chloride gave 4.1 g. of white solid, M.P. 95–96° C., having phosphorus resonance absorptions of equal areas at −15.4 and −9.8 p.p.m. relative to phosphoric acid. The compound analyzed as follows:

Calc'd for $C_{15}H_{20}Cl_6O_6P_2S_2$: C, 28.4%; H, 3.2%; Cl, 33.5%; P, 9.8%; S, 10.1%. Found: C, 28.6%; H, 3.4%; Cl, 33.2%; P, 9.7%; S, 10.1%.

It was assigned the structure,

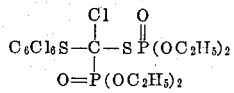

which may be named diethyl S-[(pentachlorophenylthio) (diethoxyphosphinyl)chloromethyl]phosphorothioate.

EXAMPLE 3

A 5.0 g. portion of methyl [(phenylthio)(diphenylphosphinylthio)methylene]diphenylphosphoranoate was dissolved in 50 g. of benzene, and the solution was stirred and cooled at 4–5° C. as hydrogen chloride was added until the solution was saturated. Concentration of the reaction mixture to 60° C./0.1 mm. gave a viscous tan oil that was substantially S-[(phenylthio)(diphenylphosphinyl)methyl]diphenylphosphinothioate.

EXAMPLE 4

For this example, diethyl S-[(p-chlorophenylthio) (diethoxyphosphinyl)methyl] phosphorothioate was tested for insecticidal activity using the following test procedure.

In general, the scope of this test involves observation for evidence of contact poison activity against various stages of the two-spotted spider mite, *Tetranychus telarius*, present on foliage (bean) at the time of treatment (with a dilute, aqueous spray preparation).

For this test, 0.1 cc. of liquid or 0.1 g. of solid test chemical is dissolved or suspended in 10 ml. of acetone to make a 1% concentrate. The acetone solution is then transferred to a 200 ml. Erlenmeyer flask and 3 drops of "Tween 20" (polyethylene sorbitan monolaurate) added and mixed with the sample. One hundred cc. of tap water are then added to make a 1/1000 or 0.1% preparation. Vigorous swirling for 15 seconds completely mixes the preparation. The emulsion or suspension is then poured into a 10 x 4½ x 3 cm. museum jar. Stems of bean bearing mite infested leaves are dipped and set aside in their respective holding blocks. When dry, the mite tests are set in the greenhouse for one week after which mortality observations are made.

S - [p-chlorophenylthio)(diethyoxyphosphinyl)methyl] diethyl phosphorothioate was tested for insecticidal activity in this manner and was found to be 100% effective as a miticide in primary tests at 0.1% concentration.

In secondary screening, the compound was found to have the following indicated percent kill at the indicated concentration against the recited stages of the mite, *Tetranychus telarious*:

| Stage: | Percent concentration .0063% |
|---|---|
| Mobile | 100 |
| Resting | 100 |
| Ova | 100 |
| Residual activity | 100 |

Further insecticidal activity of the compound was found to be 30% kill against the Mexican bean beetle, *Epilachna varivestis Mulsant* at a concentration of .004% when applied in a systemic test to bean foliage.

EXAMPLE 5

For this example, the compound S-[(pentachlorophenylthio)diethoxyphosphinyl)chloromethyl] diethyl phosphorothioate, was tested for contact poison activity against adults of the plum curculio, *Conotrachelus nenuphar*.

The test is conducted using the following procedure: twelve adult plum curculio, *Conotrachelus nenuphar*, of mixed sexes, two to six weeks of age, are counted into ventilated plastic tubes and held for treatment. The test solution is prepared by dissolving 100 mg. of chemical in 10 ml. of acetone to give a 0.1% on 10 μg./μl. solution.

A ¼ cc. hypodermic syringe is filled with the test solution and placed in a device calibrated to deliver one microliter of test solution from the syringe needle upon actuation. The plastic tube containing the test specimens is immersed in a beaker filled with $CO_2$ gas for sufficient time to achieve anesthetization. When this occurs, the adult beetles are poured onto a receptacle, picked up individually with forceps and treated on the thorax with one microliter of test solution. After treatment, the beetles are placed within a ventilated plastic holding tube, along with a section of apple to serve as food until the mortality observations are made 24 hours after treatment.

Using this test procedure, the compound, S-[(pentachlorophenylthio)(diethoxyphosphinyl)chloromethyl] diethyl phosphorothioate, gave 100% kill of the plum curculio at concentrations down to and including 0.063% (0.63 μg./adult beetle).

What is claimed is:

1. An insecticidal composition comprising a compound of the formula

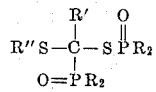

wherein R is selected from the group consisting of hydrocarbyl having from 1 to 6 carbon atoms, hydrocarbyloxy having from 1 to 6 carbon atoms, and halohydrocarbyloxy having from 1 to 6 carbon atoms, R' is selected from the group consisting of hydrogen, chloride, bromine and alkylthio having from 1 to about 15 carbon atoms, chloroalkylthio having from 1 to about 15 carbon atoms, bromoalkylthio having from 1 to about 15 carbon atoms, phenylthio, chlorophenylthio, bromophenylthio, alkylphenylthio having a total of from 7 to about 12 carbon atoms, chloroalkylphenylthio having from 7 to about 12 carbon atoms, and bromoalkylphenylthio having a total of from 7 to about 12 carbon atoms, and R" is selected from the group consisting of phenyl, chlorophenyl, bromophenyl, and alkylphenyl having from 7 to about 12 carbon atoms dispersed in an extending agent selected from the group consisting of solid and semi-solid extending agents, and organic solvents for said compound, said composition containing from about 0.1 to about 25 by weight of said compound.

2. An insecticide composition as described in claim 1 wherein in the compound R is hydrocarbyloxy having from 1 to about 6 carbon atoms, R' is hydrogen, R" is chlorophenyl, and the extending agent is an organic solvent therefor.

3. An insecticidal composition as described in claim 2 wherein R is ethyloxy having from 1 to 6 carbon atoms, R' is hydrogen, and R" is p-chlorophenyl.

4. An insecticidal composition as described in claim 2 wherein R is ethyloxy having from 1 to 6 carbon atoms, R' is chlorine, and R" is pentachlorophenyl.

5. An insecticidal concentrate comprising a phosphorus compound described by the structural formula of claim 1 dispersed in an organic solvent therefor and having dissolved therein a minor amount of a surfactant said concentrate forming an emulsion with water upon agitation therewith.

6. An insecticidal concentrate adapted to be made into a sprayable composition by the addition of water comprising a phosphorus compound described by the structural formula of claim 1 in admixture with a water-soluble surfactant in the weight proportion of 0.1 to 15 parts of surfactant and sufficient of said phosphorus compound of claim 1 to make 100 parts by weight.

7. The method of controlling insects comprising contacting the insects with a toxic amount of a compound of claim 1.

8. A method of destroying insects which comprises applying to the situs of the insect a toxic amount of a phosphorus compound of the structure described in claim 1.

(References on following page)

References Cited by the Examiner

UNITED STATES PATENTS

| | | | |
|---|---|---|---|
| 2,818,364 | 12/1957 | Birum | 260—461 |
| 2,849,476 | 8/1958 | McConnell et al. | 260—461 |
| 2,857,415 | 10/1958 | Birum | 260—461 |
| 2,911,335 | 11/1959 | Gilbert | 167—22 |
| 2,970,940 | 2/1961 | Jones et al. | 167—22 |
| 3,042,701 | 7/1962 | Birum | 260—461 |
| 3,067,233 | 12/1962 | Middleton | 260—461 |
| 3,076,012 | 1/1963 | Schicke et al. | 260—461 |

JULIAN S. LEVITT, *Primary Examiner.*

GEORGE A. MENTIS, *Assistant Examiner.*